United States Patent

Hsu et al.

[11] Patent Number: 5,995,642
[45] Date of Patent: Nov. 30, 1999

[54] METHOD FOR AUTOMATIC FINGERPRINT CLASSIFICATION

[75] Inventors: Shu-Fang Hsu, Chunan, Taiwan; Paul-Waie Shew, Singapore, Singapore; Pei-Yung Hsiao, Taipei, Taiwan

[73] Assignee: Aetex Biometric Corporation, Taipei, Taiwan

[21] Appl. No.: 08/884,197

[22] Filed: Jun. 30, 1997

[51] Int. Cl.⁶ .................................................. G06K 9/00
[52] U.S. Cl. ............................................. 382/124; 382/125
[58] Field of Search ................................. 382/115, 116, 382/124, 125, 205, 197, 227, 126; 356/71; 340/825.34

[56] References Cited

U.S. PATENT DOCUMENTS

| | | | |
|---|---|---|---|
| 4,156,230 | 5/1979 | Riganati et al. | 382/124 |
| 5,105,467 | 4/1992 | Kim et al. | 382/125 |
| 5,140,642 | 8/1992 | Hsu et al. | 382/124 |
| 5,465,303 | 11/1995 | Levison et al. | 382/124 |
| 5,497,429 | 3/1996 | Shibuya | 382/125 |
| 5,729,334 | 3/1998 | Van Ruyven | 382/125 |

Primary Examiner—Christopher S. Kelley
Assistant Examiner—Sheela Chawan

[57] ABSTRACT

A method for automatic fingerprint classification is dependent on the number of core points and the ridge flow direction around the core points. The speed of the classification process is improved by pre-processing the fingerprint image to identify the background blocks and the fingerprint blocks, so that the process only deal with the fingerprint blocks. A block directional image is constructed for the fingerprint blocks. The block directional image is then used to determine the core point(s) of the fingerprint. Based on the number of core point and the trend of the ridge direction around each core point, fingerprints can be classified into 8 classes based on a set of predetermined rules.

1 Claim, 12 Drawing Sheets

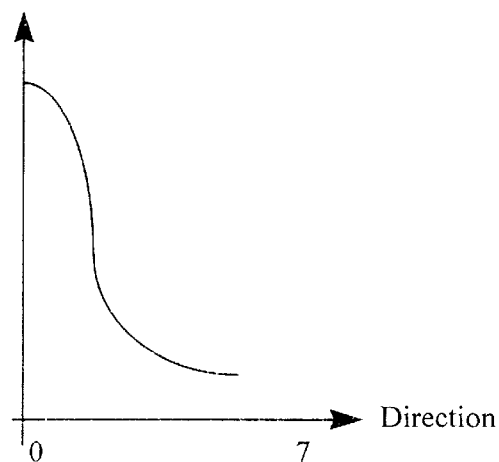
FIG. 8a Left skew
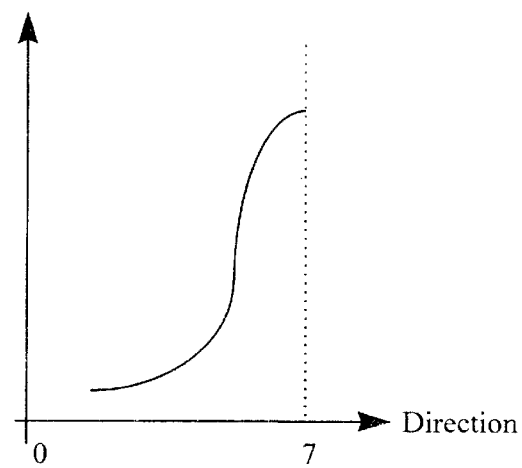
FIG. 8b Right skew
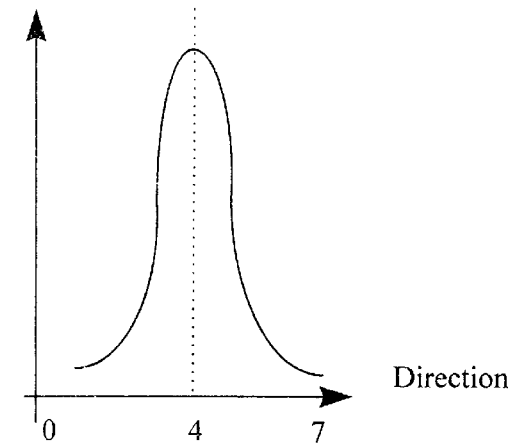
FIG. 8c Vertical skew
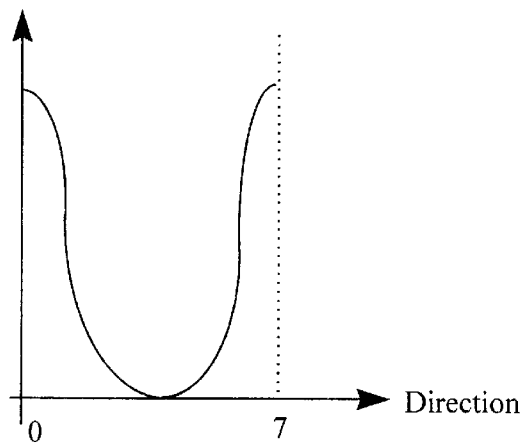
FIG. 8d Horizontal skew

| $D_{901}$ | $D_{902}$ | $D_{903}$ | $D_{904}$ | Classification |
|---|---|---|---|---|
| Right skew | Left skew | Right skew | Right skew | Right Loop |
| Right skew | Left skew | Left skew | Left skew | Left Loop |
| Right skew | Left skew | Vertical | Vertical | Tented Arch |
| Right skew | Left skew | Left skew | Right skew | Plane Arch |

FIG. 10

| $D_{1101}$ | $D_{1102}$ | $D_{1103}$ | $D_{1104}$ | Classification |
|---|---|---|---|---|
| Right skew | Left skew | Left skew | Right skew or Vertical | Right twin |
| Right skew | Left skew | Left skew or Vertical | Right skew | Left twin |
| Vertical | Vertical | Vertical | Vertical | Whorl |

FIG. 12

METHOD FOR AUTOMATIC FINGERPRINT CLASSIFICATION

BACKGROUND OF THE INVENTION

This invention relates to a method for automatic classification of a fingerprint.

Fingerprint identification can be employed in identifying individuals in an access control system, a electronic transaction system or other applications. Fingerprint classification is generally used as a pre-processing of the fingerprint identification which has a high computational complexity. Classifying the fingerprints into various classifications can narrow down the search and comparison space considerably, thus reducing the time of identification and increasing the accuracy at the same time.

Few commonly know approaches to automatic classification of fingerprints include structural, syntatic, rule based and artificial neural network. These approaches may adopt different systems of classification. For instance, in U.S. Pat. No. 5,337,369, fingerprints are classified into 5 different classes, namely, whorl, right loop, left loop, tented arch and plain arch. This invention classifies the fingerprints into a total of 8 classes, namely, right loop, left loop, tented arch, plane arch, right twin, left twin, whorl and others. There is usually a trade-off between the number of classes and the accuracy and speed of processing. However, the number of classes a method can identify will determine the practical value of the method.

The methods of automatic fingerprint classification generally begins with the identification of singularity points, e.g., core and delta points, on the fingerprint. Based on the singularity points, various methods are used further to determine the classification of the fingerprint. Note, however, that some fingerprints do not have a delta point. In such cases, those classification methods based on both core and delta points will fail. The method used in this invention only relies on the core points and the ridge flow direction around these core points to classify the fingerprints. The method disclosed in U.S. Pat. No. 5,337,369 is similar to the algorithm in this invention that it also analyses the ridge flow around the core to classify a fingerprint. However, the disclosed method only makes use of one core point in a fingerprint to classify it, thus not taking advantage of the presence of more than one core point for fingerprint classification. Besides, it only discriminates five different classes of fingerprints which may be too few in practice.

SUMMARY OF THE INVENTION

The object of this invention is to design a method for classifying a fingerprint image. The method should be accurate and immune from noise. Besides, the method should be able to distinguish 8 different fingerprint classifications basing on the number of core point(s) and the ridge flow on the fingerprint.

In order to achieve these objectives, this invention first processes the raw fingerprint image and differentiates the fingerprint region from the background region using the mean and variance of the gray level values. Subsequently, only the fingerprint region will be processed. This can improve the speed of the classification process. The fingerprint region is then subdivided into grid-shaped plural blocks. The mean ridge direction of each block in the fingerprint region is determined to form a fingerprint block directional image. With the block directional image, the core point(s) is/are located. Based on the number of core point(s) identified and the ridge direction trend around the core point(s), the present invention classifies the fingerprint into eight classes using a set of rules. According to the rules, fingerprints with only one core point, are classified into the right loop, left loop, tented arch, plane arch or others classes, whereas those with two core points are classified into the right twin, left twin, whorl and other classes.

BRIEF DESCRIPTION OF THE DRAWING

FIG. 8a shows the left skew distribute pattern in some region.

FIG. 8b shows the right skew distribute pattern in some region.

FIG. 8c shows the vertical skew distribute pattern in some region.

FIG. 8d shows the horizontal skew distribute pattern in some region.

FIG. 10 shows the ridge direction located in the four quadrants around the convex core point.

FIG. 12 shows the ridge direction located in the four quadrants around the convex core point and four quadrants around the concave core point.

DETAILED DESCRIPTION OF THE PREFERRED EMBODIMENTS

Figure 1:
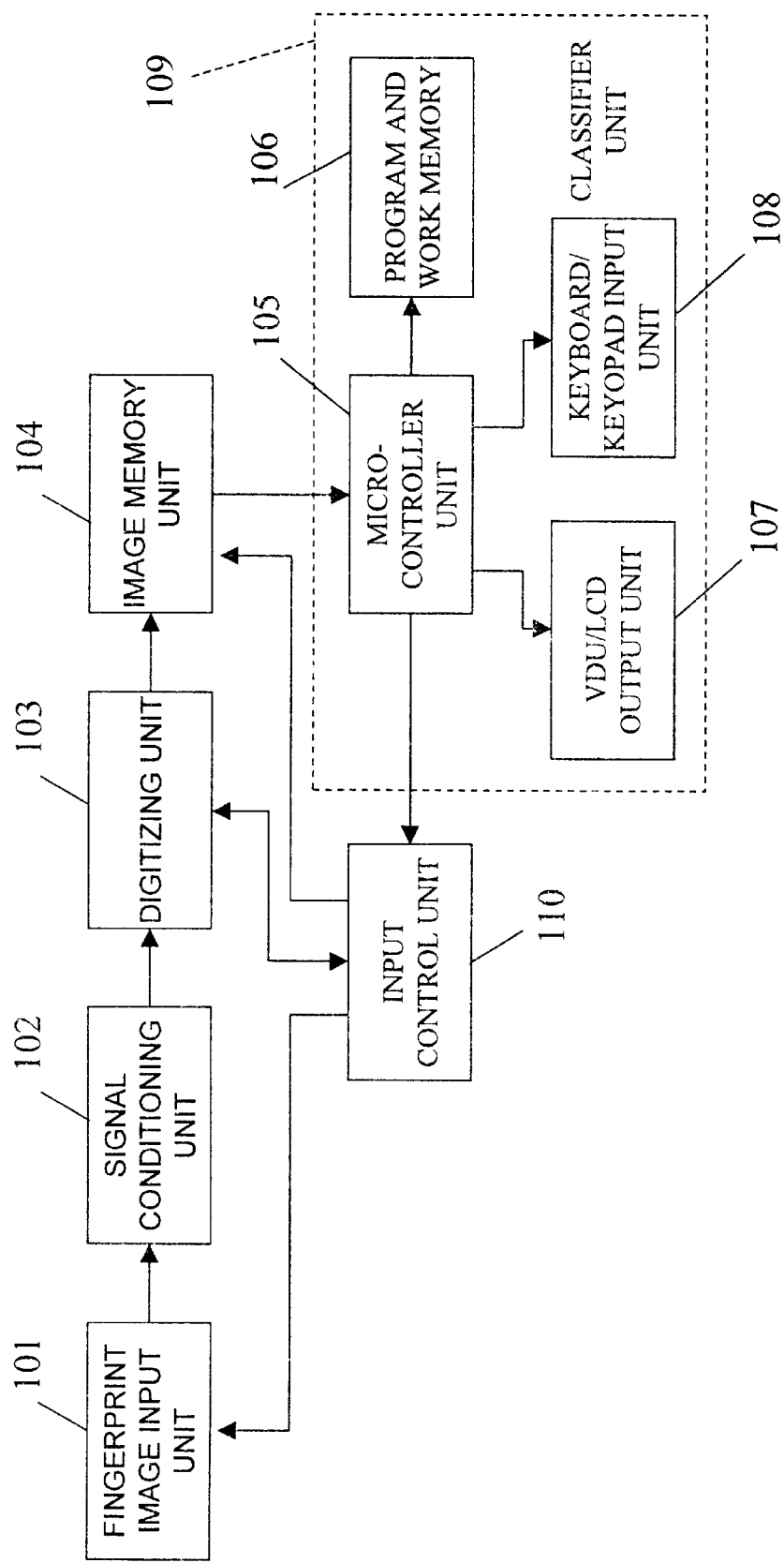
FIG. 1 shows a block diagram illustrating a system construction of an embodiment of this invention.

Referring to FIG. 1, a typical fingerprint image input unit 101, comprising an optical arrangement comprising some lens, prisms and illumination devices, and a photo-electric transducer, such as a CCD camera, is used to produce electrical signal of a fingerprint. The electrical signal is processed by the signal conditioning unit 102 before being digitized by the digitizing unit 103. The gray level digital image is stored in the image memory unit 104 for further processing. The said image acquisition process is controlled by an input control unit 110 which is in turn activated by the microcontroller unit 105 to start an image acquisition cycle.

The classifier unit 109 processes the gray level fingerprint image stored in the image memory unit 104 and output the classification result on the VDU or LCD output unit 107. The classifier unit uses the keyboard or keypad input unit 108 to interface with the user. The classifier unit, however, needs an algorithm (stored in the program and work memory unit 106) to classify the fingerprint image. An algorithm is designed for this purpose in this invention. The algorithm will be described in the following.

Figure 2:
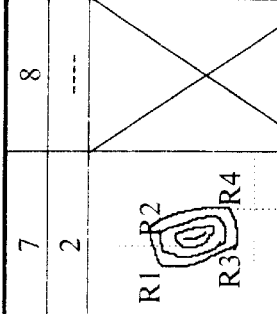
FIG. 2 shows the seven fingerprint classes in this invention.
Figure 3A:
FIG. 3a and FIG. 3b shows an example of the convex core in this invention.
Figure 3B:
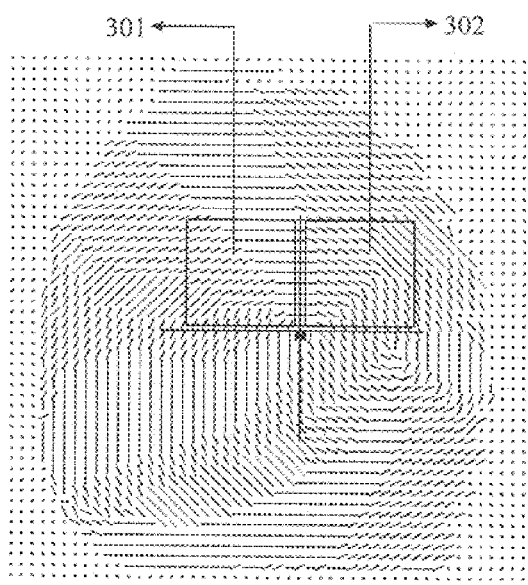
Figure 3C:
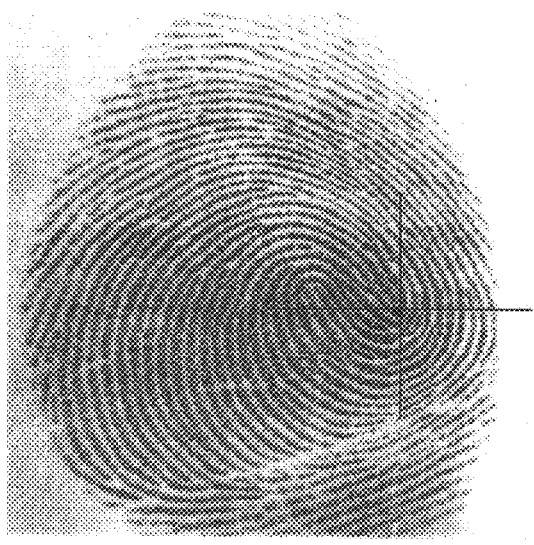
FIG. 3c and FIG. 3d shows an example of the concave core in this invention.
Figure 3D:
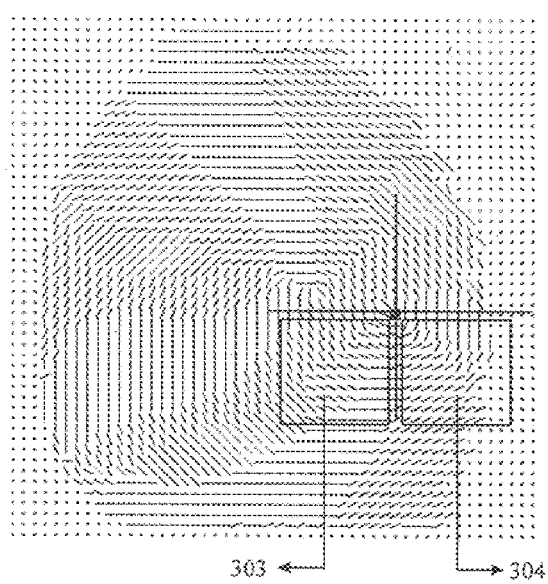

Referring to FIG. 2, this invention classifies fingerprint patterns into 8 categories, namely right loop, left loop, tented arch, plane arch, right twin, left twin, whorl and others. The classification is base on the feature points and block directional diagram of the fingerprint image. The said feature points refer to the core points of the fingerprint. Since an acquired fingerprint image is usually dis-orientated, distorted or even defiled, the feature points are determined first to help re-orientating the fingerprint and thus improving the accuracy and repeatability of the subsequent classification steps. Said core points are divided into two classes in this invention: (1) convex core point such as those shown in FIG. 3a and 3b, and (2) concave core point such as those shown in FIG. 3c and 3d.

Figure 4A:
FIG. 4a shows an example of fingerprint with one convex core.

Each fingerprint image has at least one and at most two core points. In FIG. 4a, there is only one convex core point (401), whereas in FIG. 4b, there is a convex core point (402) and a concave core point (403). Now refer to FIG. 2, a fingerprint in classes 1 to 4 has only one convex core point, whereas a fingerprint in classes 5 to 7 has a convex core point and a concave core point.

Figure 5:
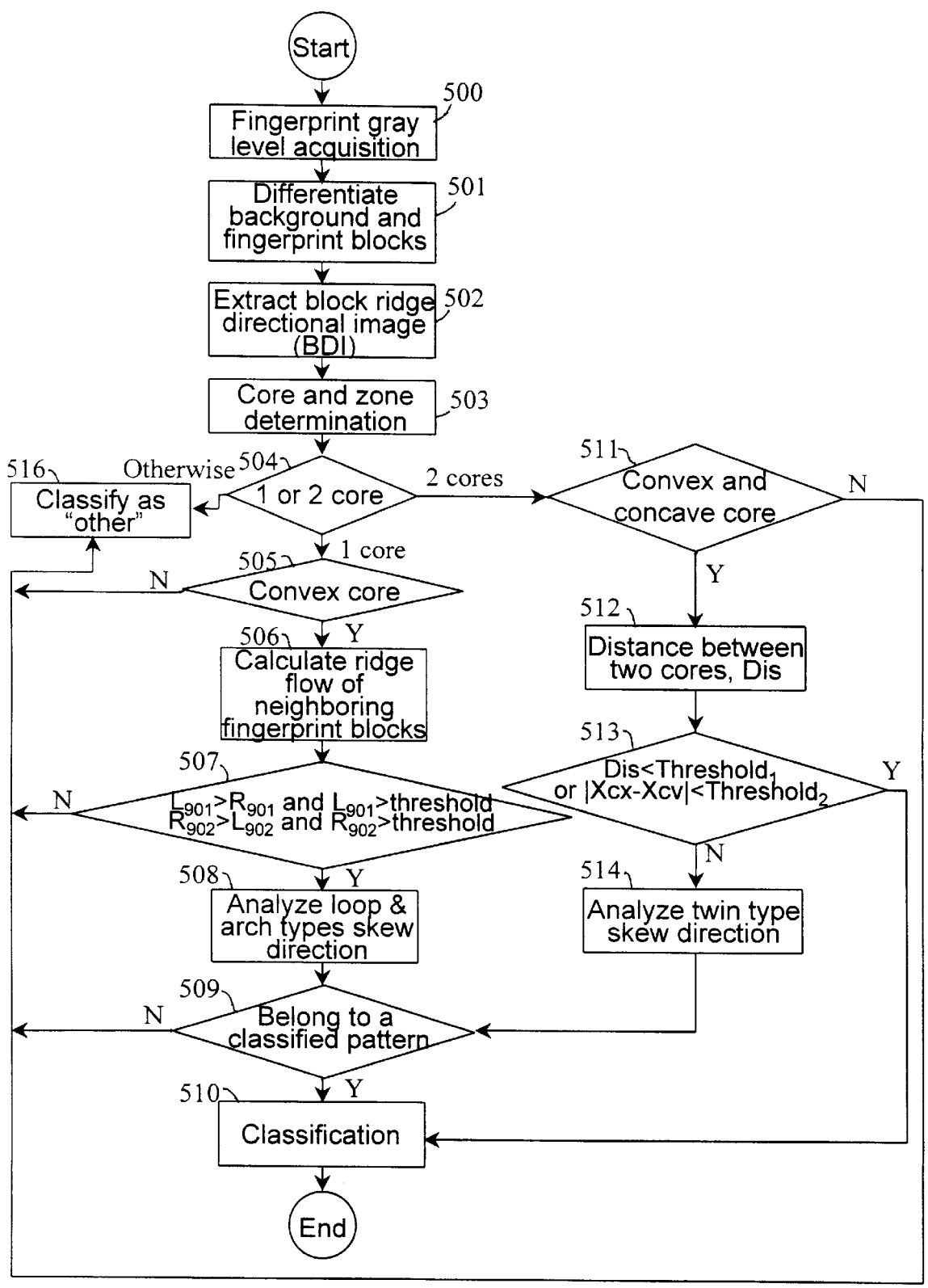
FIG. 5 shows the flow chart of a fingerprint pattern classification algorithm in this invention.
Figure 7:
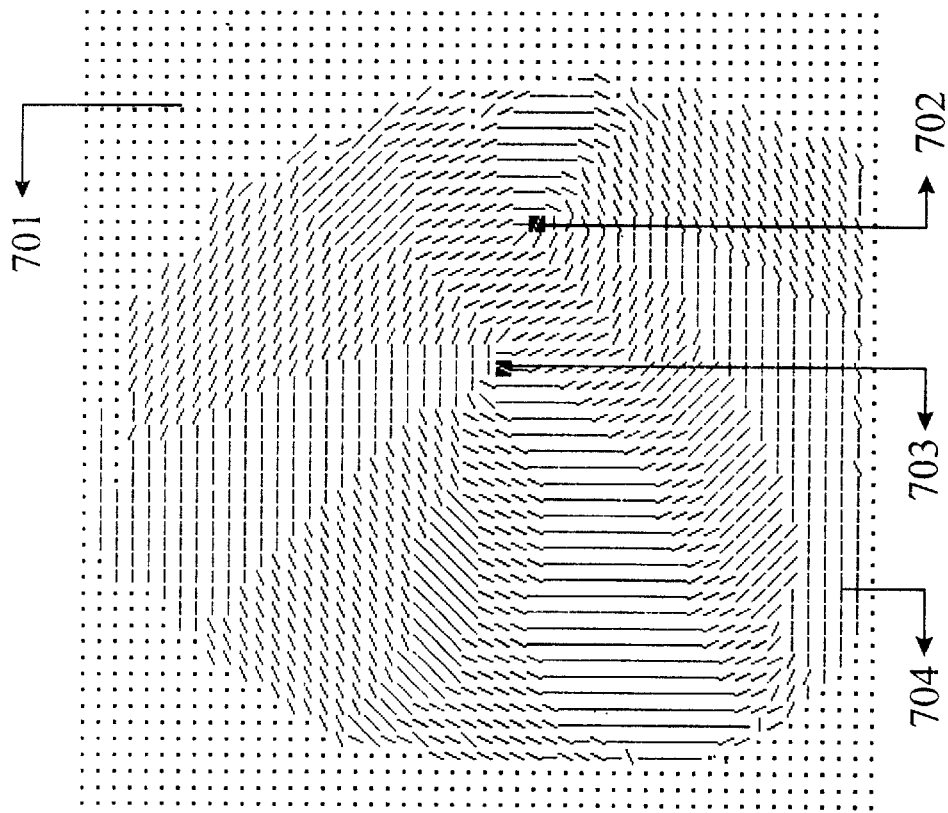
FIG. 7 shows an example of a ridge direction pattern determined from a fingerprint data.
Figure 6:
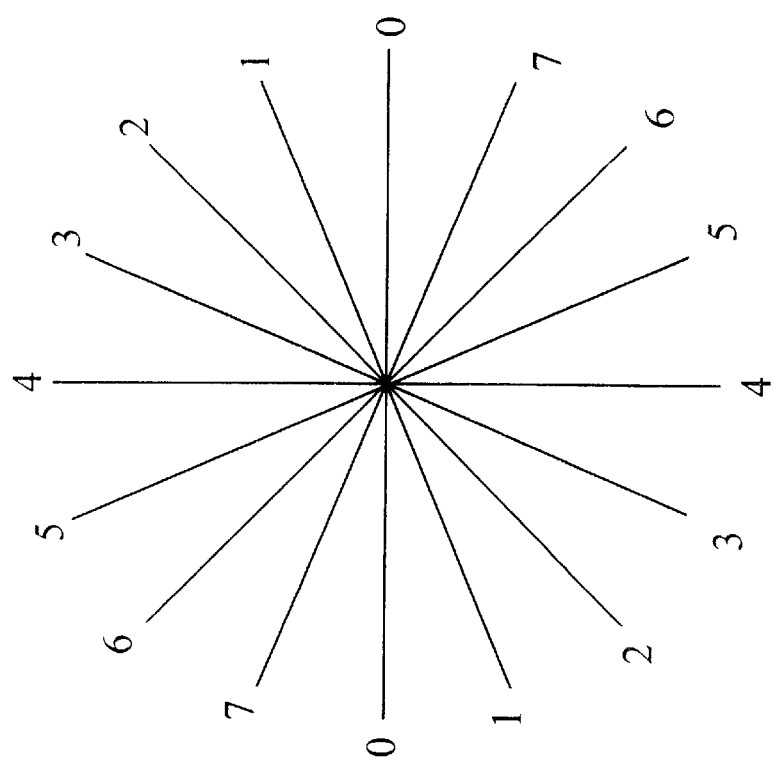
FIG. 6 shows the ridge direction labels used in this invention.

Now referring to FIG. 5, the classification begins with the acquisition of the gray level fingerprint image. A block directional image (BDI) is then generated from the raw gray level image. The said block directional image stores the general ridge flow directions. Eight flow directions are distinguished in this invention as shown in FIG. 6. As depicted in FIG. 7, the block directional image is obtained by first dividing the M×N gray level fingerprint image into plural m×n blocks thus achieving $$\frac{M}{m} \times \frac{N}{n}$$

blocks. These blocks consist of the background blocks and the fingerprint blocks. For instance, in FIG. 7, a 400×400 gray level fingerprint image is divided into 50×50 blocks of size 8×8 (in which case, M=N=400, and m=n=8). Among which (as shown in FIG. 7) region (701) consists of background blocks and region (704) consists of fingerprint blocks. The average ridge flow direction, a value between 0 and 7, as shown in FIG. 6, within each smaller block is determined. The smaller block is then assigned with this direction.

Figure 4B:
FIG. 4b shows an example of fingerprint with one convex core and one concave core.

After determining the core points and the block directional image, this invention begins to classify the fingerprint image in question. The classification steps are shown in flow chart of FIG. 5. To begin with, the fingerprint is divided into two categories, namely (1) fingerprint with one convex core point, and (2) fingerprint with a convex core point and a concave core point. FIGS. 4a and 4b illustrate each of these categories.

Figure 9:
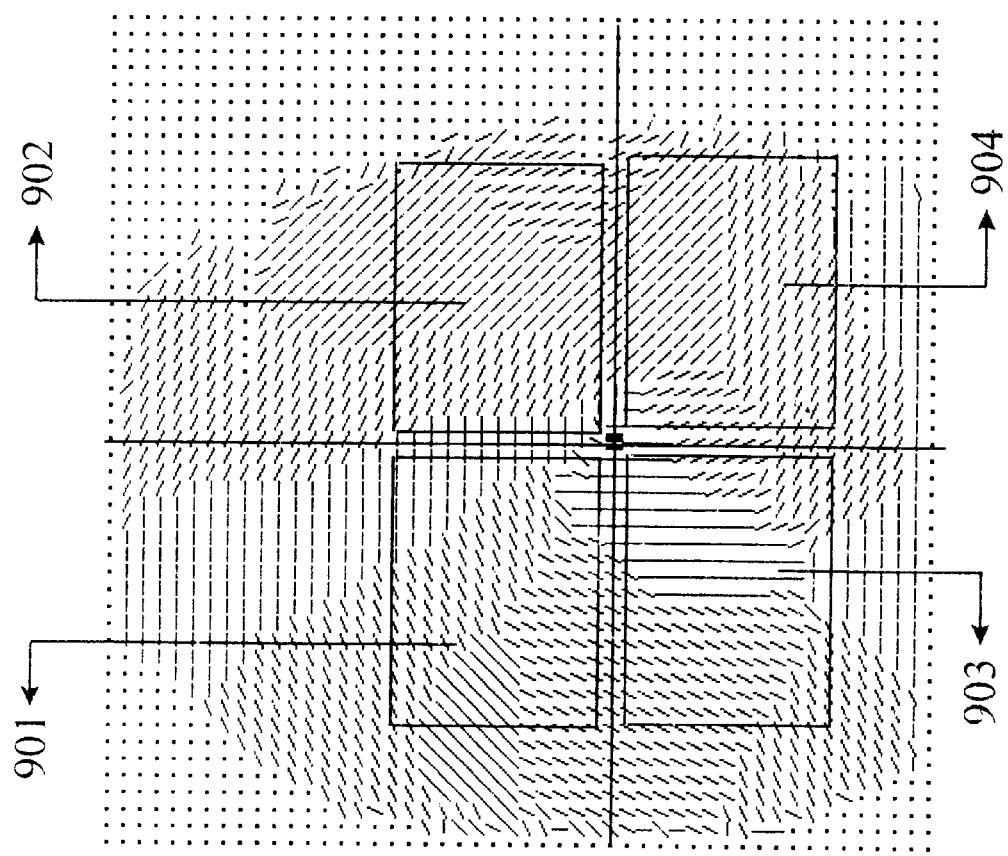
FIG. 9 illustrates means for determining ridge direction trend with one convex core point in this invention.
Figure 11B:
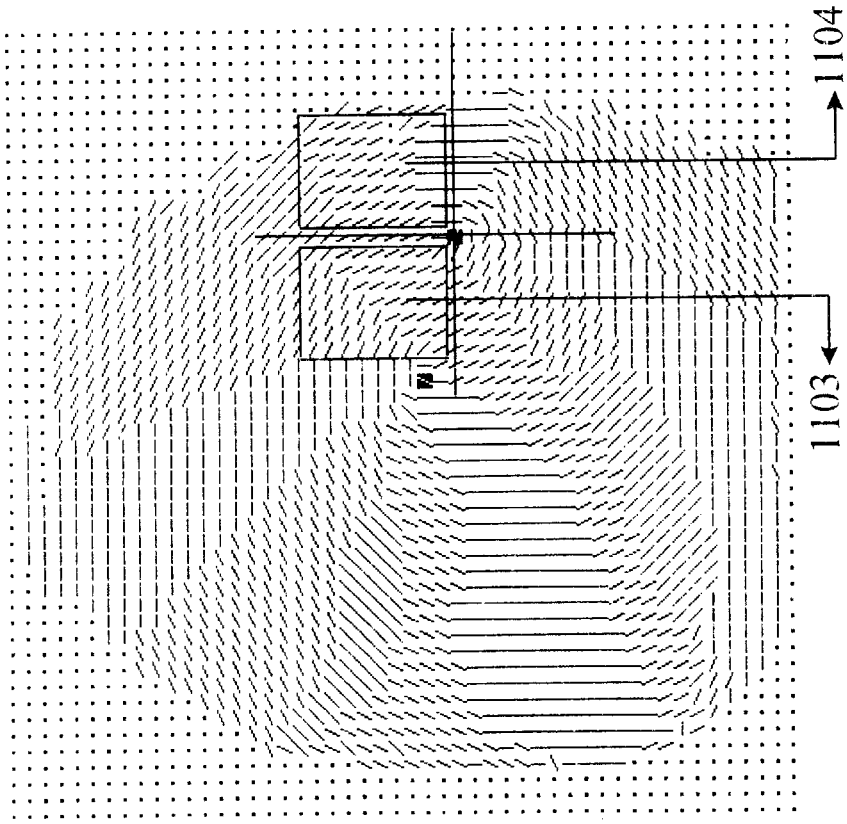
FIG. 11 illustrates means for determining ridge direction trend with one convex core point and one concave core point in this invention.
Figure 11A:
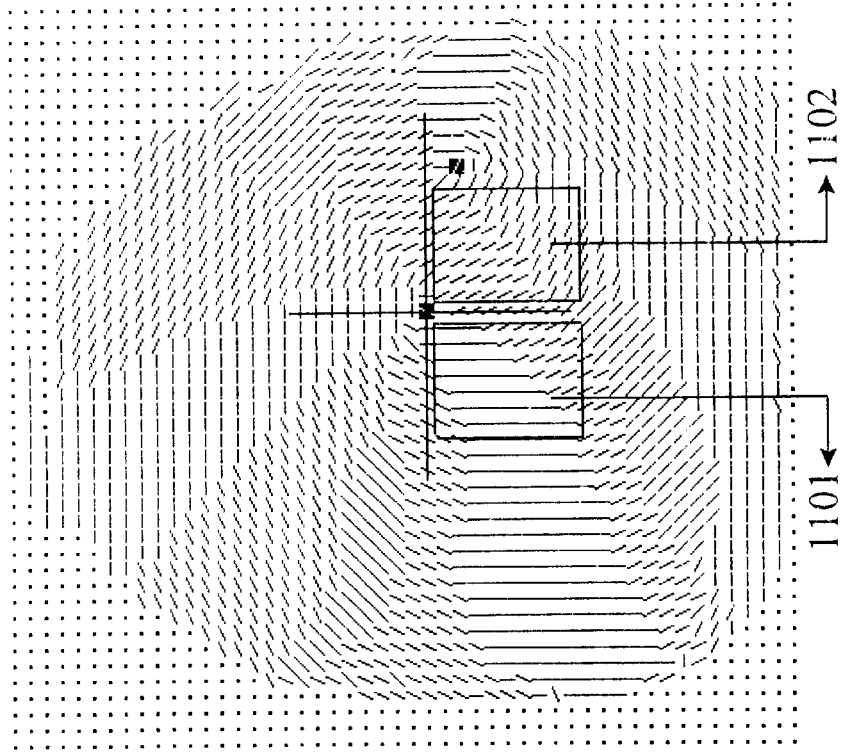

If the fingerprint in question has only one core point, as illustrated in FIG. 9, analyze the blocks in the four quadrants (with the core point as the center) (901), (902), (903) and (904) to determine whether it belongs to the right loop, left loop, tented arch or plane arch categories. Otherwise, if the fingerprint has two core point, as illustrated in FIG. 11a and 11b, analyze the ridge flow in the four regions (1101), (1102), (1103) and (1104) to determine whether it belongs to the whorl, right twin or left twin categories.

Details of the fingerprint image classification steps are described below in connection with FIG. 1 and FIG. 5. In Step 500, the microcontroller unit 105 initiates an image acquisition cycle in which the gray level fingerprint image is digitized and stored in the image memory unit 104. In Step 501, the background blocks and the fingerprint blocks are distinguished from the gray level fingerprint image obtained in Step 500. The differentiation of fingerprint blocks and background blocks is based on the mean value $$\text{Mean}(p,q) = \left( \sum_{i=0}^{m-1} \sum_{j=0}^{n-1} F(m(p-1)+i, n(q-1)+j) \right) \bigg/ m \times n \quad (1)$$

and the variance value, $$\text{Variance}(p,q) = \quad (2)$$
$$\left( \sum_{i=0}^{m-1} \sum_{j=0}^{n-1} [F(m(p-1)+i, n(q-1)+j) - \text{Mean}(p,q)] \right) \bigg/ m \times n$$

where F(x,y) is the gray level of the pixel at location (x,y) within the fingerprint image. If Mean(p,q)<threshold$_1$ and Variance(p,q)>threshold$_2$ then the block (p,q) is identified as a fingerprint block, else it is identified as a background block. Said threshold$_1$ and threshold$_2$ are two predetermined values.

The ridge flow of each of the fingerprint blocks is analyzed in Step 502 to generate the block directional image (BDI). In Step 503, the core and delta points of the fingerprint is determined based on the BDI obtained in Step 502. The classification of the fingerprint begins in Step 504 in which the number of core points is calculated. If there is only one or two cores in the fingerprint, then the classification continues to Steps 505 or 511 accordingly, otherwise, the fingerprint is classified as "other" class.

Step 505 checks further if the core is a convex core. If it is a convex core, the process continues to Step 506 else the fingerprint is classified as "other". In Step 506, the frequencies of left skew and right skew in blocks 901 and 902 as shown in FIG. 9 are determined. In connection to FIG. 6, directions, 1, 2 and 3 are referred to as left skew angles (which shown in FIG. 8a); directions 5, 6, 7 are referred to as right skew angles (which shown in FIG. 8b); direction 1, 0 and 7 are referred to as horizontal (which shown in FIG. 8c); and direction 3, 4 and 5 are referred to as vertical (which shown in FIG. 8d). The values associated to the frequencies of left skew, right skew, horizontal and vertical, which are denoted by L, R, Ver, and Hor, are calculated by equations (3), (4), (5) and (6) respectively.

$$L = \frac{a_{-1} \times H[1] + a_0 \times H[2] + a_1 \times H[3]}{a_{-1} + a_0 + a_1} \quad (3)$$

$$R = \frac{a_{-1} \times H[5] + a_0 \times H[6] + a_1 \times H[7]}{a_{-1} + a_0 + a_1} \quad (4)$$

$$Ver = \frac{a_{-1} \times H[3] + a_0 \times H[4] + a_1 \times H[5]}{a_{-1} + a_0 + a_1} \quad (5)$$

$$Hor = \frac{a_{-1} \times H[7] + a_0 \times H[0] + a_1 \times H[1]}{a_{-1} + a_0 + a_1} \quad (6)$$

where H[d] is the frequency of the blocks with direction d (d=0,1,Λ,7) as shown in FIG. 6, $\alpha_{-1}$, $\alpha_0$, and $\alpha_1$ are some predetermined weighting constants.

If the following conditions are satisfied, as considered in Step 507, the classification process continues to Step 508, else the fingerprint is classified as "other":

$$L_{901} > R_{901} \text{ and } L_{901} > \text{threshold} \quad (7)$$

$$L_{902} > L_{902} \text{ and } R_{902} > \text{threshold} \quad (8)$$

where $L_{901}$ and $L_{902}$ are the frequencies of the left skew in regions 901 and 902 (as shown in FIG. 9), while $R_{901}$ and $R_{902}$ are the frequencies of the right skew in regions 901 and 902 (as shown in FIG. 9).

Step 508 determines the mode of ridge directions in regions 901, 902, 903 and 904. The mode of ridge directions in the aforementioned regions are respectively defined as:

$$D_{901} = \{d | H_{901}(d) = Max(H_{901}(i)), i=0,1,2,\Lambda,7\} \quad (9)$$

$$D_{902} = \{d | H_{902}(d) = Max(H_{902}(i)), i=0,1,2,\Lambda,7\} \quad (10)$$

$$D_{903} = \{d | H_{903}(d) = Max(H_{903}(i)), i=0,1,2,\Lambda,7\} \quad (11)$$

$$D_{904} = \{d | H_{904}(d) = Max(H_{904}(i)), i=0,1,2,\Lambda,7\} \quad (12)$$

$H_{901}(i)$, $H_{901}(i)$, $H_{903}(i)$, $H_{904}(i)$ are the frequency of ridge direction i in the region 901, 902, 903 and 904, respectively. Referring to FIG. 10, the fingerprint is classified into right loop, left loop, arch and plane arch in Step 509 and 510, according to the following table.

| $D_{901}$ | $D_{902}$ | $D_{903}$ | $D_{904}$ | Classification |
|---|---|---|---|---|
| Right skew | Left skew | Right skew | Right skew | Right loop |
| Right skew | Left skew | Left skew | Left skew | Left loop |
| Right skew | Left skew | Vertical | Vertical | Tented Arch |
| Right skew | Left skew | Left skew | Right skew | Plane Arch |

For instance, if $D_{901} \in$ right skew, $D_{902} \in$ left skew, $D_{903} \in$ right skew, and $D_{904} \in$ right skew, then the fingerprint is classified as right loop. If none of the conditions in the above table is satisfied, then the fingerprint is classified as "other".

In Step 511, if the fingerprint has a convex and a concave core point, the classification process is continued to Step 512, else the fingerprint is classified as "other". Step 512 determines the distance, Dis, between the two core points. If Dis<threshold$_1$ or $|x_{cx} - x_{cv}| <$threshold$_2$ then the fingerprint is classified as whorl (in Step 510), where $x_{cx}$ and $x_{cv}$ are the x-coordinates of the convex and concave core points. Otherwise the fingerprint should be one of the twin (left or right) type. Again, the modes of ridge flow in regions 1101, 1102, 1103 and 1104, as shown in FIG. 11 are determined in Step 514. The mode of ridge directions in the aforementioned regions are respectively defined as:

$$D_{1101} = \{d | H_{1101}(d) = Max(H_{1101}(i)), i=0,1,2,\Lambda,7\} \quad (13)$$

$$D_{1102} = \{d | H_{1102}(d) = Max(H_{1102}(i)), i=0,1,2,\Lambda,7\} \quad (14)$$

$$D_{1103} = \{d | H_{1103}(d) = Max(H_{1103}(i)), i=0,1,2,\Lambda,7\} \quad (15)$$

$$D_{1104} = \{d | H_{1104}(d) = Max(H_{1104}(i)), i=0,1,2,\Lambda,7\} \quad (16)$$

Referring to FIG. 12, the fingerprint is classified into the right twin, left twin and whorl, according to the following table. If the ridge flow in region 1101, 1102, 1103 and 1104 is not satisfied the conditions in the following table, then the fingerprint is classified as "other" (in Step 509).

| $D_{1101}$ | $D_{1102}$ | $D_{1103}$ | $D_{1104}$ | Classification |
|---|---|---|---|---|
| Right skew | Left skew | Left skew | Right skew or Vertical | Right twin |
| Right skew | Left skew | Left skew or Right skew | | Left twin |
| Vertical | Vertical | Vertical | Vertical | Whorl |

In Step 510, if $|D_{1101} - D_{1102}| <$threshold and $|D_{1103} - D_{1104}| <$threshold then the fingerprint is classified as whorl too. Otherwise, if $|D_{1101} - D_{1102}| \geq$threshold or $|D_{1103} - D_{1104}| \geq$threshold while $x_{cx} > x_{cv}$ and $y_{cx} > y_{cv}$ then the fingerprint is classified as left twin. If $|D_{1101} - D_{1102}| \geq$threshold $|D_{1103} - D_{1104}| \geq$threshold while $x_{cx} < x_{cv}$ and $y_{cx} > y_{cv}$ then the fingerprint is classified as right twin, where $x_{cx}$, $y_{cx}$ are x- and y-coordinates of the convex core point, and $x_{cv}$, $y_{cv}$ are the x- and y-coordinates of the concave core point. If the fingerprint does not satisfy the above conditions, then it is classified as "other".

What we claim is:

1. A method for automatic classification of a fingerprint, comprising the steps of:

A. converting a M×N fingerprint image to a set of gray level digital data and storing said set of gray level digital data in an image memory unit such that the gray level of each pixel of said fingerprint image is stored at an address of said memory unit corresponding to the position of said pixel in the fingerprint image;

B. subdividing said set of gray level digital data into blocks of size m×n, thus obtaining $$\frac{M}{m} \times \frac{N}{n}$$

such blocks;

C. differentiating said blocks into fingerprint blocks and background blocks, which are the blocks corresponding to the fingerprint area in the said M×N fingerprint image and the blocks corresponding to the irrelevant background area, respectively; wherein differentiation of fingerprint blocks and background blocks is based on the mean and the variance values, the said mean value of block (p,q) is $$\text{Mean}(p, q) = \left( \sum_{i=0}^{m-1} \sum_{j=0}^{n-1} F(m(p-1)+i, n(q-1)+j) \right) \bigg/ m \times n$$

and the said variance value of block (p,q) is $$\text{Variance}(p, q) =$$

$$\left( \sum_{i=0}^{m-1} \sum_{j=0}^{n-1} [F(m(p-1)+i, n(q-1)+j) - \text{Mean}(p, q)] \right) \bigg/ m \times n$$

where F(x,y) is the gray level of the pixel at location (x,y) within the fingerprint image, and if Mean(p,q)<threshold$_1$ and Variance(p,q)>threshold$_2$, then the block (p,q) is identified as a fingerprint block, else it is identified as a background block, said threshold$_1$ and threshold$_2$ being two fixed values;

D. determining the average ridge flow direction of each said fingerprint block, which comprises the steps of
      a. quantizing the ridge flow directions into eight levels representing a direction from 0 to $7\pi/8$ with interval of $\pi/8$ and labeled d, where d=0,1,2,$\Lambda$,7 accordingly;

b. further sub-dividing the ridge flow directions into four levels comprising a horizontal direction which includes said directions d=0,1,7, a vertical direction which includes said directions d=3,4,5, a left skew direction which includes said directions d=1,2,3, and a right skew direction including said directions d=5, 6,7;

E. determining one or two core points within said fingerprint blocks, based on the said average ridge flow direction of each fingerprint block;

F. classifying the fingerprint image into eight classes, based on the said core point(s) and said average ridge flow direction of each fingerprint block, which comprises the steps of:
  a. identifying the four fingerprint blocks located in the four quadrants around the core point, these fingerprint blocks are labeled R1, R2, R3 and R4, where R1 represents the top-left quadrant, R2 represents the top-right quadrant, R3 represents the bottom-left quadrant and R4 represents the bottom-right quadrant;
  b. classifying the fingerprint as right loop where there is only one convex core point and directions of said R1, R3 and R4 are right skew, while the direction of said R2 is left skew;
  c. classifying the fingerprint as left loop where there is only one convex core point and directions of said R2, R3 and R4 are left skew, while the direction of said R1 is right skew.
  d. classifying the fingerprint as arch where there is only one convex core point and directions of said R3 and R4 are vertical, while the direction of said R1 is right skew and the direction of R2 is left skew;
  e. classifying the fingerprint as plane arch where there is only one convex core point and directions of said R1 and R4 are right skew, while the direction of said R2 and R4 are left skew;
  f. classifying the fingerprint as left twin where there is a convex core point with x-coordinate $x_{cx}$ and a concave core point with x-coordinate $x_{cv}$, such that $x_{cx}<x_{cv}$ and the direction of said R3 associated to the convex core point and the direction of said R1 associated to the concave core point are left skew or vertical and the direction of said R4 associated to the convex core point and the direction of R2 associated to the concave core point are right skew or vertical, in addition, the angular different between said R3 and R4 and the angular difference between said R1 and R2 are greater than threshold which is a fixed threshold value;
  g. classifying the fingerprint as right twin where there is a convex core point with x-coordinate $x_{cx}$ and a concave core point with x-coordinate $x_{cv}$, such that $x_{cx}>x_{cv}$ and the direction of said R3 associated to the convex core point and the direction of said R1 associated to the concave core point are left skew or vertical and the direction of said R4 associated to the convex core point and the direction of R2 associated to the concave core point are right skew or vertical, in addition, the angular different between said R3 and R4 and the angular difference between said R1 and R2 are greater than threshold which is a fixed threshold value;
  h. classifying the fingerprint as whorl where there is a convex core point and a concave point, and the direction of said R3 and R4 associated to the convex core point and the direction of said R1 and R2 associated to the concave core point are vertical, in addition, the angular difference between said R3 and R4 and the angular difference between said R1 and R2 are smaller than threshold which is a fixed threshold value; and
  i. classifying the fingerprint as others, when the fingerprint does not belong to any of the said classifications.

* * * * *